United States Patent
Chen et al.

(10) Patent No.: US 11,277,238 B2
(45) Date of Patent: Mar. 15, 2022

(54) PHASE TRACKING REFERENCE SIGNAL CONFIGURATION, DETERMINATION AND INFORMATION FEEDBACK METHODS AND DEVICES

(71) Applicant: XI'AN ZHONGXING NEW SOFTWARE CO., LTD., Xi'An (CN)

(72) Inventors: Yijian Chen, Shenzhen (CN); Zhaohua Lu, Shenzhen (CN); Hao Wu, Shenzhen (CN); Bo Gao, Shenzhen (CN); Nan Zhang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 16 days.

(21) Appl. No.: 16/484,341

(22) PCT Filed: Mar. 14, 2018

(86) PCT No.: PCT/CN2018/079023
§ 371 (c)(1),
(2) Date: Oct. 25, 2019

(87) PCT Pub. No.: WO2018/145668
PCT Pub. Date: Aug. 16, 2018

(65) Prior Publication Data
US 2020/0213050 A1 Jul. 2, 2020

(30) Foreign Application Priority Data
Feb. 7, 2017 (CN) .......................... 201710067997.6

(51) Int. Cl.
*H04L 5/00* (2006.01)
(52) U.S. Cl.
CPC .......... *H04L 5/0048* (2013.01); *H04L 5/0007* (2013.01); *H04L 5/0094* (2013.01)

(58) Field of Classification Search
CPC .... H04L 5/0048; H04L 5/0007; H04L 5/0094
See application file for complete search history.

(56) References Cited

U.S. PATENT DOCUMENTS 10,439,663 B2 * 10/2019 Islam .................... H04L 5/0051
10,812,239 B2 * 10/2020 Gao ..................... H04B 7/0626
(Continued)

FOREIGN PATENT DOCUMENTS

| CN | 101795145 A | 8/2010 |
|----|-------------|--------|
| CN | 104982063 A | 10/2015 |

(Continued)

OTHER PUBLICATIONS

Cisco et al., "Verizon 5G TF; Air Interface Working Group; Verizon 5th Generation Radio Access; Physical Layer Procedures (Release 1)", TS V5G.213 v1.0—43 pages (Jun. 30, 2016).
(Continued)

*Primary Examiner* — James M Perez
(74) *Attorney, Agent, or Firm* — Knobbe, Martens, Olson & Bear, LLP

(57) ABSTRACT

Provided are phase tracking reference signal (PTRS) configuration, determination and information feedback methods and devices. The PTRS configuration method includes: transmitting, by a first node, the control information to a second node, where the control information is used for indicating a configuration parameter of the PTRS to the second node and the PTRS is transmitted by the first node or the second node. The second node determines the configuration parameter of the PTRS through the control information transmitted by the first node and/or an agreed implicit rule. A third node transmits control information to a fourth node, where the control information is used for feeding received power or quality information of the PTRS back to the fourth node.

16 Claims, 4 Drawing Sheets

A first node transmits control information to a second node, where the control information is used for indicating a configuration parameter of a PTRS to the second node and the PTRS is transmitted by the first node or the second node — 301

(56) References Cited

U.S. PATENT DOCUMENTS

| | | | |
|---|---|---|---|
| 10,820,331 B2* | 10/2020 | Yoo | H04W 72/085 |
| 10,986,622 B2* | 4/2021 | Zhang | H04B 7/088 |
| 11,088,792 B2* | 8/2021 | Zhang | H04L 27/2659 |
| 2015/0098535 A1* | 4/2015 | Wu | H04B 1/1027 375/350 |
| 2015/0365154 A1* | 12/2015 | Davydov | H04B 7/0632 370/329 |
| 2015/0382318 A1* | 12/2015 | Kim | G01S 5/0054 455/456.5 |
| 2016/0087708 A1* | 3/2016 | Kang | H04B 7/0621 370/312 |
| 2017/0294926 A1* | 10/2017 | Islam | H04B 1/1027 |
| 2017/0303144 A1* | 10/2017 | Guo | H04L 5/0048 |
| 2017/0317731 A1* | 11/2017 | Chen | H04W 24/10 |
| 2018/0014254 A1* | 1/2018 | Hwang | H04W 52/24 |
| 2018/0131492 A1* | 5/2018 | John Wilson | H04B 7/0408 |
| 2018/0227929 A1* | 8/2018 | Yoo | H04W 72/085 |
| 2018/0351719 A1* | 12/2018 | Lee | H04L 5/0053 |
| 2018/0367277 A1* | 12/2018 | Zhang | H04L 5/0048 |
| 2019/0036666 A1* | 1/2019 | Li | H04W 72/044 |
| 2019/0097776 A1* | 3/2019 | Kim | H04L 5/0053 |
| 2019/0124631 A1* | 4/2019 | Ren | H04W 72/042 |
| 2019/0140801 A1* | 5/2019 | Ko | H04L 5/005 |
| 2019/0141691 A1* | 5/2019 | Kwon | H04W 72/046 |
| 2019/0141693 A1* | 5/2019 | Guo | H04W 72/042 |
| 2019/0158342 A1* | 5/2019 | Lee | H04L 27/3438 |
| 2019/0166615 A1* | 5/2019 | Nimbalker | H04W 72/1284 |
| 2019/0173720 A1* | 6/2019 | Xue | H04L 27/2666 |
| 2019/0182001 A1* | 6/2019 | Lee | H04L 5/0048 |
| 2019/0182777 A1* | 6/2019 | Zhang | H04W 52/18 |
| 2019/0222386 A1* | 7/2019 | Guo | H04W 72/12 |
| 2019/0246395 A1* | 8/2019 | Huang | H04W 72/0446 |
| 2019/0260532 A1* | 8/2019 | Manolakos | H04L 5/0023 |
| 2019/0261329 A1* | 8/2019 | Park | H04L 5/0048 |
| 2019/0273637 A1* | 9/2019 | Zhang | H04B 7/022 |
| 2019/0273643 A1* | 9/2019 | Dong | H04L 27/2636 |
| 2019/0274169 A1* | 9/2019 | Tsai | H04B 7/088 |
| 2019/0281587 A1* | 9/2019 | Zhang | H04L 5/0053 |
| 2019/0297603 A1* | 9/2019 | Guo | H04B 7/0695 |
| 2019/0326964 A1* | 10/2019 | Li | H04L 25/02 |
| 2019/0342905 A1* | 11/2019 | Ren | H04W 72/12 |
| 2019/0342907 A1* | 11/2019 | Huang | H04L 5/0053 |
| 2019/0349240 A1* | 11/2019 | Saito | H04L 5/0048 |
| 2019/0356443 A1* | 11/2019 | Lee | H04L 5/0048 |
| 2019/0373588 A1* | 12/2019 | Bae | H04L 5/0044 |
| 2019/0379431 A1* | 12/2019 | Park | H04L 27/2613 |
| 2019/0380114 A1* | 12/2019 | Yokomakura | H04B 17/24 |
| 2020/0008102 A1* | 1/2020 | Yokomakura | H04L 1/0003 |
| 2020/0008228 A1* | 1/2020 | Lee | H04L 27/261 |
| 2020/0014514 A1* | 1/2020 | Gao | H04W 72/082 |
| 2020/0021413 A1* | 1/2020 | Park | H04L 5/0094 |
| 2020/0022087 A1* | 1/2020 | Dou | H04W 72/042 |
| 2020/0022172 A1* | 1/2020 | Sun | H04L 5/0091 |
| 2020/0028563 A1* | 1/2020 | Gao | H04L 5/0091 |
| 2020/0028609 A1* | 1/2020 | Ahn | H04L 5/0051 |
| 2020/0028640 A1* | 1/2020 | Yeo | H04L 5/005 |
| 2020/0029235 A1* | 1/2020 | Yokomakura | H04L 1/0026 |
| 2020/0112355 A1* | 4/2020 | Park | H04B 7/0626 |
| 2020/0119858 A1* | 4/2020 | Ren | H04W 72/0466 |
| 2020/0128586 A1* | 4/2020 | Takahashi | H04W 36/08 |
| 2020/0163078 A1* | 5/2020 | Jiang | H04J 13/18 |
| 2020/0177416 A1* | 6/2020 | Jiang | H04L 5/10 |
| 2020/0213050 A1* | 7/2020 | Chen | H04L 5/0048 |
| 2020/0221487 A1* | 7/2020 | Lee | H04L 5/0053 |
| 2020/0229161 A1* | 7/2020 | Raghavan | H04L 5/0091 |
| 2020/0235832 A1* | 7/2020 | Lee | H04L 5/00 |
| 2020/0235979 A1* | 7/2020 | Yokomakura | H04L 27/2636 |
| 2020/0280409 A1* | 9/2020 | Grant | H04B 7/0697 |
| 2020/0280940 A1* | 9/2020 | Kim | H04W 72/0446 |
| 2020/0304256 A1* | 9/2020 | Park | H04L 5/0048 |
| 2020/0351892 A1* | 11/2020 | Yi | H04L 5/0092 |
| 2021/0091902 A1* | 3/2021 | Yamada | H04L 5/0048 |
| 2021/0111846 A1* | 4/2021 | Lee | H04L 5/001 |
| 2021/0119688 A1* | 4/2021 | Enescu | H04B 7/0695 |
| 2021/0175937 A1* | 6/2021 | Yamada | H04B 7/0486 |
| 2021/0258200 A1* | 8/2021 | Lee | H04L 5/0048 |
| 2021/0329609 A1* | 10/2021 | Park | H04W 16/28 |

FOREIGN PATENT DOCUMENTS

| | | |
|---|---|---|
| CN | 105450272 A | 3/2016 |
| CN | 106160987 A | 11/2016 |
| CN | 107733563 A | 2/2018 |
| CN | 107733612 A | 2/2018 |
| CN | 107733623 A | 2/2018 |

OTHER PUBLICATIONS

International Search Report of corresponding Patent Application No. PCT/CN2018/079023—6 pages (dated Jun. 14, 2018).

Cisco et al., "Verizon 5G TF; Air Interface Working Group; Verizon 5th Generation Radio Access; Physical channels and modulation (Release 1)", TS V5G.211 V1.3—79 pages (Jun. 2016).

CMCC: "Phase Noise Reference Signal Design for High Frequency Systems", Nov. 14-18, 2016, 3GPP TSG RAN WG1 Meeting #87, R1-1612186.

Ericsson: "Design considerations for phase noise tracking RS (PTRS)", Nov. 14-18, 2016, 3GPP TSG RAN WG1 Meeting #87, R1-1612333.

Huawei, HiSilicon: "Further details for PT-RS design", Feb. 13-17, 2017, 3GPP TSG RAN WG1 Meeting #88, R1-1701698.

Ericsson: " On PTRS design", Feb. 13-17, 2017, 3GPP TSG RAN WG1 Meeting #88, R1-1703220.

First Search Report for CN 201710067997.6.

First Office Action for CN 201710067997.6 dated Sep. 15, 2021.

\* cited by examiner

| A first node transmits control information to a second node, where the control information is used for indicating a configuration parameter of a PTRS to the second node and the PTRS is transmitted by the first node or the second node | 301 |

FIG. 3

| A second node determines a configuration parameter of a PTRS through control information transmitted by a first node and/or an agreed implicit rule, where the PTRS is transmitted by the first node or the second node | 401 |

FIG. 4

| A third node transmits control information to a fourth node, where the control information is used for feeding received power or quality information of a PTRS back to the four node | 501 |

FIG. 5

PTRS configuration device

Configuration unit 61

FIG. 6

PTRS determination device

Determination unit 71

FIG. 7

PHASE TRACKING REFERENCE SIGNAL CONFIGURATION, DETERMINATION AND INFORMATION FEEDBACK METHODS AND DEVICES

CROSS REFERENCE TO RELATED APPLICATIONS

This is a National Stage Application, filed under 35 U.S.C. 371, of International Patent Application No. PCT/CN2018/079023, filed on Mar. 14, 2018, which claims priority to Chinese patent application No. 201710067997.6 filed on Feb. 7, 2017, contents of both of which are incorporated herein by reference in their entireties.

TECHNICAL FIELD

The present disclosure relates to the field of communications and, in particular, to phase tracking reference signal (PTRS) configuration, determination and information feedback methods and devices.

BACKGROUND

Phase noise refers to random variations of the phase of an output signal of a system (such as various radio frequency devices) due to various noise. Three elements for describing a radio wave are an amplitude, a frequency and a phase. The frequency and the phase influence each other. In an ideal case, a radio signal of a fixed frequency has a fixed fluctuation period, just as a normal flight of an airplane which has fixed departure time. A pulse signal (with a spectral width close to zero) in frequency domain is a sine wave of a certain frequency in time domain. However, practically, a signal always has a certain spectral width, and due to noise, the signal has power at a distance far away from a central frequency, which is just like a flight with a delay of more than one hour. A signal at a distance far away from the central frequency is called a sideband signal. The sideband signal may be squeezed into an adjacent frequency, as a delayed flight which may occupy time of other flights and cause a confused flight schedule. The sideband signal is called the phase noise.

In a practical communication system, the perpetual phase noise results from all devices using Local Oscillation (LO). For an Orthogonal Frequency Division Multiplexing (OFDM) system, the importance of maintaining orthogonality between subcarriers is apparent so that the phase noise in the OFDM system mainly results from the LO of a transmitting end and a receiving end.

The magnitude of the phase noise is related to the frequency. A high frequency system has a more serious phase noise problem. Since the noise is inherently multiplicative and cannot be handled as additive noise by increasing power or multi-antenna forming to improve performance, a reference signal for measuring the phase noise is introduced for compensation. A phase noise compensation reference signal may be simply referred to as a phase tracking reference signal (PTRS).

SUMMARY

The following is a summary of the subject matter described herein in detail. This summary is not intended to limit the scope of the claims.

Embodiments of the present disclosure provide phase tracking reference signal (PTRS) configuration, determination and information feedback methods and devices.

An embodiment of the present disclosure provides PTRS configuration method configuration method. The method includes a step described below.

A first node transmits control information to a second node, where the control information is used for indicating a configuration parameter of a PTRS to the second node.

The PTRS is transmitted by the first node or the second node.

An embodiment of the present disclosure provides PTRS determination method determination method. The method includes a step described below.

A second node determines a configuration parameter of the PTRS through control information transmitted by a first node and/or an agreed implicit rule.

The PTRS is transmitted by the first node or the second node.

An embodiment of the present disclosure provides a information feedback method. The method includes a step described below.

A third node transmits control information to a fourth node, where the control information is used for feeding received power or quality information of the PTRS back to the fourth node.

An embodiment of the present disclosure provides PTRS configuration device configuration device. The device is applied to a first node and includes a configuration unit.

The configuration unit is configured to transmit control information to a second node. The control information is used for indicating a configuration parameter of the PTRS to the second node.

The PTRS is transmitted by the first node or the second node.

An embodiment of the present disclosure provides PTRS determination device determination device. The device is applied to a second node and includes a determination unit.

The determination unit is configured to determine a configuration parameter of the PTRS through control information transmitted by a first node and/or an agreed implicit rule.

The PTRS is transmitted by the first node or the second node.

An embodiment of the present disclosure provides a PTRS information feedback device. The device is applied to a third node and includes a feedback unit.

The feedback unit is configured to transmit control information to a fourth node. The control information is used for feeding received power or quality information of the PTRS back to the fourth node.

An embodiment of the present disclosure further provides a computer-readable storage medium. The computer-readable storage medium is configured to store computer-executable instructions for implementing any one of the methods described above when are executed by a processor.

In solutions in the embodiments of the present disclosure, the first node transmits the control information to the second node. The control information is used for indicating the configuration parameter of the PTRS to the second node and the PTRS is transmitted by the first node or the second node. The second node determines the configuration parameter of the PTRS through the control information transmitted by the first node and/or the agreed implicit rule. The third node transmits the control information to the fourth node. The control information is used for feeding the received power or the quality information of the PTRS back to the fourth node.

The solutions in the embodiments of the present disclosure can effectively reduce reference signal overheads and improve estimation performance with higher flexibility and are affected to a smaller degree by an interference or blocking problem.

Other aspects can be understood after the drawings and the detailed description are read and understood.

BRIEF DESCRIPTION OF DRAWINGS

FIG. 3 is a flowchart of a PTRS configuration method according to an embodiment of the present disclosure;

FIG. 4 is a flowchart of a PTRS determination method according to an embodiment of the present disclosure;

FIG. 5 is a flowchart of a PTRS information feedback method according to an embodiment of the present disclosure;

FIG. 6 is a block diagram of a PTRS configuration device according to an embodiment of the present disclosure;

FIG. 7 is a block diagram of a PTRS determination device according to an embodiment of the present disclosure.

DETAILED DESCRIPTION

In an existing communication system, a PTRS design considers simply. Generally, each transport layer corresponds to one PTRS. A correspondence here generally indicates that phase noise is correlated. Other description manners such as joint demodulation are not excluded. However, in a multi-antenna system, it is typical to employ multiple transport layers for transmission. Therefore, a main problem of the method for transmitting the PTRS is large overheads and unnecessary wastes of reference signal overheads. Another design is that when multi-layer transmission is employed in the multi-antenna system, all layers correspond to the same PTRS port. However, this manner has poor flexibility. When multiple different transmission nodes perform transmission, inaccurate phase noise estimation may be caused mainly because different nodes may have different LO.

To provide a more detailed understanding of features and technical content of embodiments of the present disclosure, an implementation of the embodiments of the present disclosure is described below in detail in conjunction with the drawings. The drawings are provided for reference only and are not intended to limit the embodiments of the present disclosure.

In a practical communication system, the perpetual phase noise results from all devices using LO. For an OFDM system, importance of maintaining orthogonality between subcarriers is apparent so that the phase noise in the OFDM system mainly results from the LO of a transmitting end and a receiving end. The OFDM system with the phase noise is shown in FIG. 1.

Figure 1:
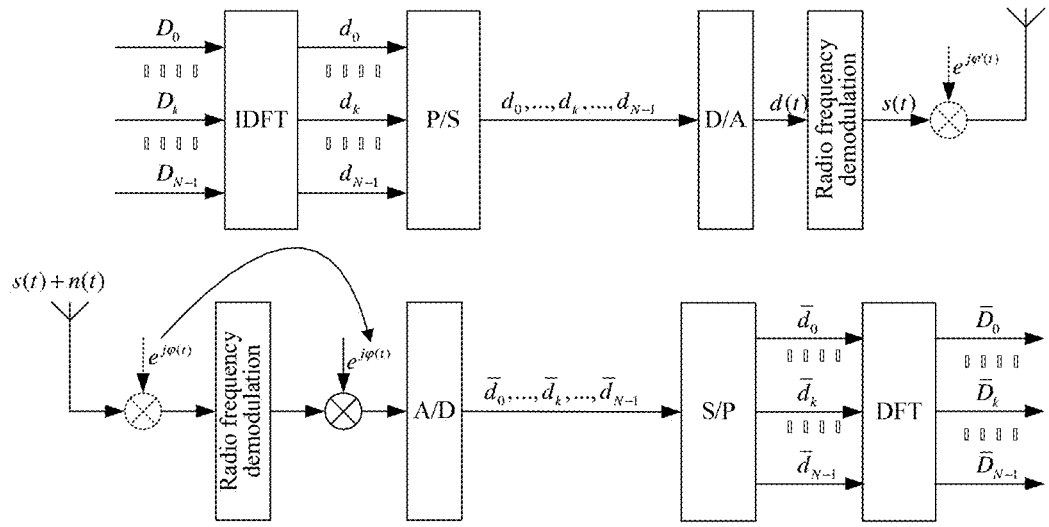
FIG. 1 is a block diagram of an OFDM system with phase noise.
Figure 2:
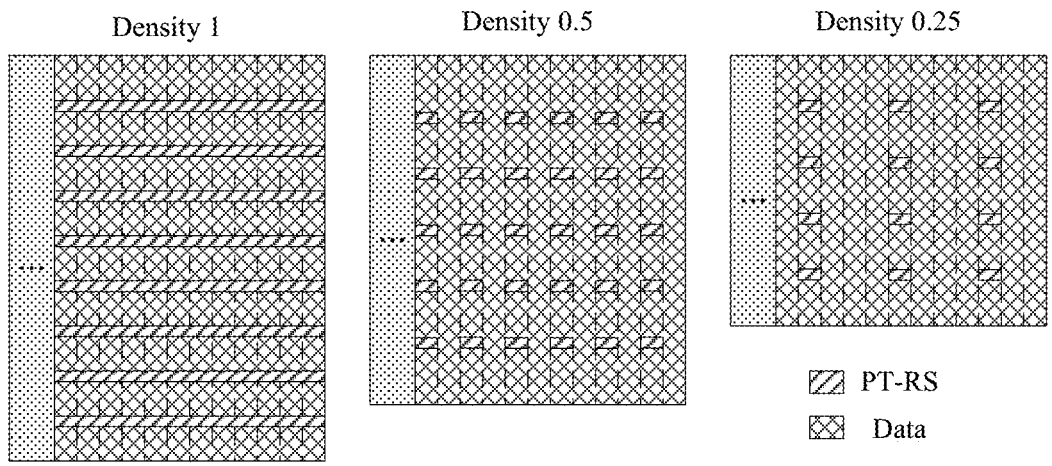
FIG. 2 is a schematic diagram of a PTRS.

In FIG. 1, the OFDM system has N subcarriers and a length of useful symbols is $T_u$ so that a spacing between subcarriers is $B_u 1/T_u$ and a system bandwidth is equal $B=NB_u$ Assuming that the equivalent phase noise is $\theta(t)=e^{j\varphi(t)}$ since $\varphi(t)$ varies randomly with time and may be considered as a random process, $\theta(t)$ may also be considered as a random process. The phase noise is another manner for measuring a timing change of a signal, and its result is shown in frequency domain. The phase noise is interpreted by an oscillator signal. Entire power of an oscillator should be concentrated at a frequency f=fo without the phase noise. However, the phase noise makes partial power of the oscillator expand into an adjacent frequency, and a sideband is generated, which affects a surrounding subcarrier and causes performance losses. An magnitude of the phase noise is related to a frequency. A high frequency system has a more serious phase noise problem. Since the noise is inherently multiplicative and cannot be handled as additive noise by increasing power or multi-antenna forming to improve performance, a reference signal for measuring the phase noise is introduced for compensation. A phase noise compensation reference signal may be simply referred to as a PTRS. As shown in FIG. 2, by measuring a high-density time domain PTRS, a terminal may estimate the phase noise and makes a supplement during demodulation, thereby improving performance and avoiding influence on a phase when a high-order modulation and coding scheme is employed.

In the communication system, the PTRS design considers simply. Generally, each transport layer corresponds to one PTRS. The correspondence here generally indicates that the phase noise is correlated. Other description manners such as joint demodulation are not excluded. However, in the multi-antenna system, it is typical to employ the multiple transport layers for transmission. Therefore, the main problem of the method for transmitting the PTRS is the large overheads and the unnecessary wastes of reference signal overheads. Another design is that when the multi-layer transmission is employed in the multi-antenna system, all layers correspond to the same PTRS port. However, this manner has poor flexibility. When the multiple different transmission nodes perform transmission, the inaccurate phase noise estimation may be caused mainly because different nodes may have different LO. The preceding PTRS design has at least the problems described below.

(1) A manner capable of flexibly and efficiently ensuring performance of the PTRS and minimizing the overheads of the PTRS is required. The problem exists in uplink communication (from the terminal to a base station), downlink communication (from the base station to the terminal), communication between base stations and communication between terminals.

In addition, there is no good technique for controlling power of the PTRS in the uplink and no mechanism for notifying the power of the PTRS in the downlink.

(2) A relevant mechanism for performing PTRS power control or PTRS power indications is required and a good balance between PTRS power and performance cannot be achieved.

(3) Transmission precoding of the PTRS is associated with precoding of a first layer, which has a problem that if the PTRS is disturbed after the precoding is employed or since a space corresponding to the first layer has blocking which easily occurs at a high frequency, the performance of the PTRS cannot be ensured. If the PTRS corresponds to multiple layers, a problem will cause great influence. In addition, considering mapping flexibility, it cannot be ensured that the first layer has best transmission performance under all circumstances. Therefore, the precoding of the PTRS has poor robustness and insufficient flexibility.

FIG. 3 is a flowchart of a PTRS configuration method according to an embodiment of the present disclosure. As shown in FIG. 3, the PTRS configuration method includes a step described below.

In step 301, a first node transmits control information to a second node. The control information is used for indicating a configuration parameter of the PTRS to the second node and the PTRS is transmitted by the first node or the second node.

In an embodiment of the present disclosure, in condition that the configuration parameter is a power configuration parameter, the configuration parameter includes at least one of: a transmission power offset between ports of the PTRS; a transmission power offset of the PTRS relative to a demodulation reference signal (DMRS) port; a transmission power offset of the PTRS relative to a sounding reference signal (SRS) port; a transmission power offset of the PTRS relative to data information; a transmission power offset of the PTRS relative to the control information; a transmission power offset of the PTRS relative to a channel state information-reference signal (CSI-RS); or a transmission power offset of the PTRS relative to a beam reference signal (BRS).

In an embodiment of the present disclosure, in condition that the configuration parameter is the power configuration parameter, a way for indicating the configuration parameter includes at least one of steps described below.

An offset value is indicated through the control information.

An offset reference object is indicated through the control information.

A power offset value is indicated through precoding information.

Reference signal information associated with power of the PTRS is indicated.

The way for indicating the configuration parameter further includes at least one of steps described below.

Selection information of an associated SRS port of PTRS port power is indicated.

Selection information of an associated DMRS port of the PTRS port power is indicated.

Selection information of an associated CSI-RS port of the PTRS port power is indicated.

Selection information of an associated BRS port of the PTRS port power is indicated.

The way for indicating the configuration parameter further includes indicating a reference signal type associated with the PTRS port power, where the reference signal type includes at least one of a DMRS, an SRS, a CSI-RS or a BRS.

Indicating the reference signal information associated with the power of the PTRS includes indicating that the power of the PTRS is the same as power of an associated reference signal port; or indicating that the power of the PTRS is a sum of power of associated reference signal ports.

In an embodiment of the present disclosure, in condition that the configuration parameter is a precoding configuration parameter, the way for indicating the configuration parameter includes indicating an associated reference signal of PTRS port precoding.

The way for indicating the configuration parameter further includes at least one of steps described below.

Selection information of an associated SRS port of the PTRS port precoding is indicated.

Selection information of an associated DMRS port of the PTRS port precoding is indicated.

Selection information of an associated CSI-RS port of the PTRS port precoding is indicated.

Selection information of an associated BRS port of the PTRS port precoding is indicated.

The way for indicating the configuration parameter further includes notifying a reference signal type associated with the PTRS port precoding, where the reference signal type includes at least one of the DMRS, the SRS, the CSI-RS or the BRS.

Indicating the associated reference signal of the PTRS port precoding includes: indicating that the PTRS port precoding is the same as precoding of the associated reference signal port; or indicating that the PTRS port precoding is a weighted combination of the associated reference signal ports.

In an embodiment of the present disclosure, in condition that the configuration parameter is a density configuration parameter, the way for indicating the configuration parameter includes at least one of steps described below.

An associated reference signal of a PTRS port density is indicated.

A multiple relationship of the PTRS port density relative to the associated reference signal is indicated.

The PTRS port density is the same as a density of the associated reference signal port; or the PTRS port density is an integer multiple of the density of the associated reference signal port.

In an embodiment of the present disclosure, in condition that the configuration parameter is a sequence configuration parameter, the way for indicating the configuration parameter includes: indicating an associated reference signal of a PTRS port sequence.

In an embodiment of the present disclosure, indicating the associated reference signal of the PTRS port sequence includes indicating that a PTRS sequence has a same sequence parameter as the associated reference signal port. The sequence parameter includes at least one of a sequence type or a sequence initialization parameter.

In an embodiment of the present disclosure, in condition that the configuration parameter is a quasi-co-location parameter, the way for indicating the configuration parameter includes at least one of steps described below.

Selection information of an SRS port quasi-co-located with a PTRS port is indicated.

Selection information of a DMRS port quasi-co-located with the PTRS port is indicated.

Selection information of a CSI-RS port quasi-co-located with the PTRS port is indicated.

Selection information of a BRS port quasi-co-located with the PTRS port is indicated.

In an embodiment of the present disclosure, in condition that the configuration parameter is a resource configuration parameter, the way for indicating the configuration parameter includes: indicating a maximum number of subcarriers or a maximum number of resource elements (REs) of the PTRS port in frequency domain.

In an embodiment of the present disclosure, in condition that the configuration parameter is a parameter for indicating an association relationship between the DMRS port and the PTRS port, the first node indicates PTRS group information associated with the DMRS port via signaling and/or the first node indicates DMRS port group information associated with the PTRS port via the signaling.

It is assumed that DMRS ports are $p1, \ldots,$ and $pn$, and PTRS ports are $q1, \ldots,$ and $qn$.

The DMRS ports are grouped into X groups, and each group may include one or more DMRS ports. A grouping manner may be determined according to a mapping manner from an antenna to a reference signal port, or may be determined according to a mapping manner from a codeword stream to a port.

A first transmission node determines PTRS port group information associated with part or all of the DMRS port groups. A meaning of an association is that the PTRS port group and the DMRS port group have a similar phase noise characteristic. One DMRS port group corresponds to one group of PTRS ports. The first transmission node indicates via signaling PTRS ports included in the PTRS port group associated with the DMRS port group.

The first transmission node may also determine DMRS port group information associated with part or all of PTRS port groups. The meaning of the association is that the PTRS port group and the DMRS port group have the similar phase noise characteristic. One PTRS port group corresponds to one group of DMRS ports. The first transmission node indicates via the signaling DMRS ports included in the DMRS port group associated with the PTRS port group.

FIG. 4 is a flowchart of a PTRS determination method according to an embodiment of the present disclosure. As shown in FIG. 4, the PTRS determination method includes a step described below.

In step 401, a second node determines a configuration parameter of the PTRS through control information transmitted by a first node and/or an agreed implicit rule. The PTRS is transmitted by the first node or the second node.

In an embodiment of the present disclosure, in condition that the configuration parameter is a parameter for indicating an association relationship between a DMRS port and a PTRS port, a step in which the second node determines the association relationship between the DMRS port and the PTRS port through the agreed implicit rule specifically includes at least one of steps described below.

A grouping manner of the PTRS is determined according to a number of ports of the PTRS.

The grouping manner of the PTRS is determined according to a density parameter of the PTRS.

The grouping manner of the PTRS is determined according to a modulation and coding scheme (MCS).

The grouping manner of the PTRS is determined according to an allocated frequency domain resource and/or an allocated time domain resource.

The grouping manner of the PTRS is determined according to an operating frequency.

The grouping manner of the PTRS is determined according to a transmission mode/technical type.

The grouping manner of the PTRS is determined according to a type of downlink control information (DCI).

The grouping manner of the PTRS is determined according to a power parameter of the PTRS.

The grouping manner of the PTRS is determined according to mapping from a code stream to a layer.

The grouping manner of the PTRS is determined according to a multiple access manner.

The grouping manner of the PTRS is determined according to a value of an orthogonal cover code (OCC).

A density of the PTRS is determined according to a maximum number of PTRS REs.

In an embodiment of the present disclosure, in condition that the configuration parameter is a precoding indication parameter, a step in which the second node determines PTRS precoding through the agreed implicit rule specifically includes a step described below.

A codeword is selected from a precoding set for the PTRS precoding according to agreed time domain and/or an agreed time domain resource position.

For example, precoding of the PTRS port is defined on the DMRS port. Assuming that there are p DMRS ports and q PTRS ports, the precoding is a q*p matrix, that is, the PTRS port is linearly combined with the DMRS port. The matrix may be selected from the precoding set which may be some agreed codewords or some codewords configured by a base station. A selection rule may be selecting different codewords on different time and frequency resources. The selection rule may be pre-agreed. The PTRS precoding may be determined according to position of the time and frequency resources.

In an embodiment of the present disclosure, in condition that the configuration parameter is a parameter for indicating a transmission state of the PTRS, the second node determines the transmission state of the PTRS according to the MCS and PTRS transmission state configuration signaling transmitted by the first node. The transmission state includes at least one of: non-transmission, zero power transmission or non-zero power transmission.

For example, the base station transmits 1-bit signaling to indicate the transmission state of the PTRS, and a terminal determines the transmission state of the PTRS according to the indication signaling in conjunction with the MCS.

The non-transmission means that the PTRS is not transmitted, and resources do not need to be reserved for the PTRS and may be used for transmitting other channels or signals.

The zero power transmission means that the PTRS is not transmitted, and positions of the PTRS need to be reserved.

The non-zero power transmission means that the PTRS is transmitted.

If the 1-bit signaling indicates that the PTRS exists and the MCS is low, the second node may consider that it is necessary to perform the zero power transmission of the PTRS.

If the 1-bit signaling indicates that the PTRS exists and the MCS is high, the second node may consider that it is necessary to perform the non-zero power transmission of the PTRS.

If the 1-bit signaling indicates that the PTRS does not exist, the second node may consider that it is unnecessary to transmit the PTRS.

In an embodiment of the present disclosure, in condition that the configuration parameter is a power configuration parameter, the configuration parameter includes at least one of: a transmission power offset between ports of the PTRS; a transmission power offset of the PTRS relative to the DMRS port; a transmission power offset of the PTRS relative to an SRS port; a transmission power offset of the PTRS relative to data information; a transmission power offset of the PTRS relative to the control information; a transmission power offset of the PTRS relative to a CSI-RS; or a transmission power offset of the PTRS relative to a BRS.

In an embodiment of the present disclosure, in condition that the configuration parameter is the power configuration parameter, the second node determines, through the control information transmitted by the first node, at least one of a power offset value, an offset reference object or a precoding weight value.

In an embodiment of the present disclosure, in condition that the configuration parameter is the power configuration parameter, the second node determines, through the control information transmitted by the first node, at least one of: selection information of an associated SRS port of PTRS port power; selection information of an associated DMRS port of the PTRS port power; selection information of an associated CSI-RS port of the PTRS port power; or selection information of an associated BRS port of the PTRS port power.

In an embodiment of the present disclosure, in condition that the configuration parameter is a power parameter, a step in which the second node determines the power parameter of the PTRS through the agreed implicit rule specifically includes at least one of steps described below.

The power parameter of the PTRS is determined according to the number of ports of the PTRS.

The power parameter of the PTRS is determined according to a number of DMRS ports associated with the PTRS.

The power parameter of the PTRS is determined according to power of a DMRS associated with the PTRS.

The power parameter of the PTRS is determined according to the MCS.

The power parameter of the PTRS is determined according to the allocated frequency domain resource and/or the allocated time domain resource.

The power parameter of the PTRS is determined according to the operating frequency.

The power parameter of the PTRS is determined according to the transmission mode/technical type.

The power parameter of the PTRS is determined according to the type of DCI.

The power parameter of the PTRS is determined according to a time/frequency density of the PTRS.

The power parameter of the PTRS is determined according to the mapping from a code stream to a layer.

The power parameter of the PTRS is determined according to the multiple access manner.

The power parameter of the PTRS is determined according to the value of the OCC.

The power parameter of the PTRS is determined according to a PTRS sequence.

The power parameter of the PTRS is determined according to a quasi-co-location relationship between the PTRS and another reference signal.

The power parameter includes an absolute power value or the power offset value.

In an embodiment of the present disclosure, in condition that the configuration parameter is a density parameter, a step in which the second node determines the density of the PTRS through the agreed implicit rule specifically includes at least one of steps described below.

The density parameter of the PTRS is determined according to the number of ports of the PTRS.

The density parameter of the PTRS is determined according to the number of DMRS ports associated with the PTRS.

The density parameter of the PTRS is determined according to a density of the DMRS associated with the PTRS.

The density parameter of the PTRS is determined according to the MCS.

The density parameter of the PTRS is determined according to the allocated frequency domain resource and/or the allocated time domain resource.

The density parameter of the PTRS is determined according to the operating frequency.

The density parameter of the PTRS is determined according to the transmission mode/technical type.

The density parameter of the PTRS is determined according to the type of DCI.

The density parameter of the PTRS is determined according to the power parameter of the PTRS.

The density parameter of the PTRS is determined according to the mapping from a code stream to a layer.

The density parameter of the PTRS is determined according to the multiple access manner.

The density parameter of the PTRS is determined according to the value of the OCC.

The density of the PTRS is determined according to the maximum number of PTRS REs.

The density of the PTRS is determined according to a quasi-co-location relationship on a frequency offset or a Doppler offset between the PTRS and the other reference signal.

The density parameter includes a time domain density and/or a frequency domain density.

In an embodiment of the present disclosure, in condition that the configuration parameter is a number of ports, a step in which the second node determines the number of ports of the PTRS through the agreed implicit rule specifically includes at least one of steps described below.

The number of ports of the PTRS is determined according to the density of the PTRS.

The number of ports of the PTRS is determined according to the MCS.

The number of ports of the PTRS is determined according to the allocated frequency domain resource and/or the allocated time domain resource.

The number of ports of the PTRS is determined according to the operating frequency.

The number of ports of the PTRS is determined according to the transmission mode/technical type.

The number of ports of the PTRS is determined according to the type of DCI.

The number of ports of the PTRS is determined according to the time/frequency density of the PTRS.

The number of ports of the PTRS is determined according to the mapping from a code stream to a layer.

The number of ports of the PTRS is determined according to the multiple access manner.

The number of ports of the PTRS is determined according to the value of the OCC.

The number of ports of the PTRS is determined according to the quasi-co-location relationship between the PTRS and the other reference signal.

In an embodiment of the present disclosure, in condition that the configuration parameter is a sequence parameter, a step in which the second node determines the sequence parameter of the PTRS through the agreed implicit rule specifically includes at least one of steps described below.

The sequence parameter of the PTRS is determined according to the MCS.

The sequence parameter of the PTRS is determined according to the allocated frequency domain resource and/or the allocated time domain resource.

The sequence parameter of the PTRS is determined according to the operating frequency.

The sequence parameter of the PTRS is determined according to the transmission mode/technical type.

The sequence parameter of the PTRS is determined according to the type of DCI.

The sequence parameter of the PTRS is determined according to the multiple access manner.

The sequence parameter of the PTRS is determined according to a sequence parameter of a reference signal associated with the PTRS.

The sequence parameter includes at least one of a sequence initialization parameter or a sequence type.

In an embodiment of the present disclosure, in condition that the configuration parameter is a pattern of the PTRS, a step in which the second node determines the pattern of the PTRS through the agreed implicit rule specifically includes at least one of steps described below.

The pattern of the PTRS is determined according to the number of ports of the PTRS.

The pattern of the PTRS is determined according to a pattern of a DMRS port associated with the PTRS.

The pattern of the PTRS is determined according to the MCS.

The pattern of the PTRS is determined according to the allocated frequency domain resource and/or the allocated time domain resource.

The pattern of the PTRS is determined according to the operating frequency.

The pattern of the PTRS is determined according to the transmission mode/technical type.

The pattern of the PTRS is determined according to the type of DCI.

The pattern of the PTRS is determined according to the power parameter of the PTRS.

The pattern of the PTRS is determined according to the mapping from a code stream to a layer.

The pattern of the PTRS is determined according to the multiple access manner.

The pattern of the PTRS is determined according to the value of the OCC.

The pattern of the PTRS is determined according to the maximum number of PTRS REs.

In an embodiment of the present disclosure, in condition that the configuration parameter is a resource configuration parameter, the second node determines, through the control information transmitted by the first node, a maximum number of subcarriers or a maximum number of REs of the PTRS port in frequency domain.

FIG. 5 is a flowchart of a PTRS information feedback method according to an embodiment of the present disclosure. As shown in FIG. 5, the information feedback method for a PTRS includes a step described below.

In step 501, a third node transmits control information to a fourth node. The control information is used for feeding received power or quality information of the PTRS back to the fourth node.

In an embodiment of the present disclosure, the received power or the quality information includes at least one of: the received power or a quality offset between ports of the PTRS; the received power or the quality offset of the PTRS relative to a DMRS port; the received power or the quality offset of the PTRS relative to an SRS port; the received power or the quality offset of the PTRS relative to date information; the received power or the quality offset of the PTRS relative to the control information; the received power or the quality offset of the PTRS relative to a CSI-RS; or the received power or the quality offset of the PTRS relative to a BRS.

Solutions in the embodiments of the present disclosure are further described below in detail in conjunction with specific application examples.

Example 1

A first node transmits control information to a second node to indicate a configuration parameter of a PTRS to the second node.

Here, the first node is a base station and the second node is a terminal.

Alternatively, the first node is the base station and the second node is also the base station.

Alternatively, the first node is the terminal and the second node is also the terminal.

Alternatively, the first node is the terminal and the second node is the base station.

The configuration parameter of the PTRS may be the PTRS transmitted by the first node.

The configuration parameter of the PTRS may also be the PTRS transmitted by the second node.

The configuration parameter of the PTRS includes various types of parameters such as a power parameter, a density parameter, a precoding parameter and a sequence parameter.

Sub-Implementation Manner 1

In condition that the parameter is a power configuration parameter, the parameter includes one or more of the following items:

A transmission power offset between ports of the PTRS represents a relative difference between the ports of the PTRS.

A transmission power offset of the PTRS relative to a DMRS port represents a relative difference of transmission power of a PTRS port relative to the DMRS port.

A transmission power offset of the PTRS relative to an SRS port represents a relative difference of transmission power of the PTRS port relative to the SRS port.

A transmission power offset of the PTRS relative to data information represents a relative difference of transmission power of the PTRS port relative to data.

A transmission power offset of the PTRS relative to the control information represents a relative difference of transmission power of the PTRS port relative to the control information.

A transmission power offset of the PTRS relative to a CSI-RS represents a relative difference of transmission power of the PTRS port relative to a CSI-RS port.

A transmission power offset of the PTRS relative to a BRS represents a relative difference of transmission power of the PTRS port relative to a BRS port.

Some reference signal types mentioned here are described as follows: a downlink CSI-RS; or an uplink SRS.

The two types of reference signals are respectively used for downlink and uplink CSI measurement and may be transmitted in a periodic or aperiodic manner. For specific configuration and usage, reference may be made to technical specifications, TS 36.211 and TS36.213 of a 3rd Generation Partnership Project (3GPP). Measurement reference signals for multiple ports are supported in both the downlink and the uplink.

With the development of technologies, due to an introduction of more antennas and more serving beams in 5G, these reference signals may have some new designs, for example, these reference signals are transmitted in a beam scanning manner and have more diverse transmission configuration.

In addition, other types of measurement reference signals also exist due to other measurement requirements, such as measurement of a received signal quality of some cells/sectors related to mobility management and measurement of large scale properties. These reference signals are also a type of measurement reference signal. The above measurement functions may be implemented through the CSI-RS/SRS. Some other reference signals, such as a BRS or other measurement reference signals with other names may also be additionally transmitted.

The DMRS is short for a demodulation reference signal, including a DMRS for data and a DMRS for control. After obtaining channel information, a transmitting end may perform transmission of precoded data or control according to the channel information, and may employ one or more layers of multi-antenna transmission technology. Generally, each layer has a corresponding DMRS, and the data or control information is demodulated by using a channel estimated by the DMRS in conjunction with the received signal. The DMRS is divided into an uplink (UL) DMRS and a downlink (DL) DMRS, respectively used for demodulation of downlink control/data, and demodulation of uplink control/data.

In condition that the parameter is the power configuration parameter, an indication method includes one or more of manners described below.

1. An offset value is indicated through the control information. The offset value may be measured by a decibel (dB).

An offset may be an offset between ports, a power offset between PTRSs transmitted on different time domain resources, a power offset between PTRSs on different frequency domain resources and/or time domain resources, or a power offset between PTRSs on different code domain resources.

2. An offset reference object is indicated through the control information. For example, the offset reference object is the CSI-RS, the DL DMRS, the BRS, the SRS or the UL DMRS. Which reference signal is the reference object needs to be indicated.

3. Reference signal information associated with power of the PTRS is notified, for example, which reference signal ports are used as the reference object.

For example:

Selection information of an associated SRS port of PTRS port power is indicated.

Selection information of an associated DMRS port of the PTRS port power is indicated.

Selection information of an associated CSI-RS port of the PTRS port power is indicated.

Selection information of an associated BRS port of the PTRS port power is indicated.

An association relationship includes that the power of the PTRS is the same as power of an associated reference signal port, or that the power of the PTRS is a sum of power of associated reference signal ports.

4. A power offset value is indicated through precoding information. For example, a 0 element in a precoding matrix or vector indicates that the corresponding port is not selected. A non-zero element in the precoding matrix represents that the corresponding port is selected. A difference between module values squared of the non-zero elements indicates a power difference between the ports.

Signaling here may be physical layer signal, medium access control (MAC) layer signal or high layer radio resource control (RRC) signaling.

Sub-Implementation Manner 2

In condition that the parameter is a precoding configuration parameter, the first node may indicate an associated reference signal of PTRS port precoding via signaling. An indication method includes one or more of steps described below.

Selection information of an associated SRS port of the PTRS port precoding is indicated.

Selection information of an associated DMRS port of the PTRS port precoding is indicated.

Selection information of an associated CSI-RS port of the PTRS port precoding is indicated.

Selection information of an associated BRS port of the PTRS port precoding is indicated.

An association relationship includes that PTRS precoding is the same as precoding of an associated reference signal port, or that the PTRS precoding is a weighted combination of associated reference signal ports.

The indication method may further include notifying a reference signal type associated with the PTRS port precoding. A candidate type includes at least one of a DMRS, an SRS, a CSI-RS or a BRS.

Sub-Implementation Manner 3

In condition that the parameter is a density configuration parameter, an indication method includes one or more of indicating an associated reference signal of a PTRS port density, or indicating a multiple relationship of the PTRS port density relative to the associated reference signal. An association relationship includes that a PTRS density is the same as a density of an associated reference signal port; or the PTRS density is an integer multiple of the density of the associated reference signal port.

Sub-Implementation Manner 4

In condition that the parameter is a sequence configuration parameter, an indication method includes one or more of indicating an associated reference signal of a PTRS port sequence. An association relationship includes that a PTRS sequence has a same sequence parameter as an associated reference signal port. The sequence parameter includes one or more of a sequence type or a sequence initialization parameter.

Sub-Implementation Manner 5

In condition that the parameter is a quasi-co-location parameter, an indication method includes one or more of steps described below.

Selection information of an SRS port quasi-co-located with a PTRS port is indicated.

Selection information of a DMRS port quasi-co-located with the PTRS port is indicated.

Selection information of a CSI-RS port quasi-co-located with the PTRS port is indicated.

Selection information of a BRS port quasi-co-located with the PTRS port is indicated.

Example 2

This embodiment provides a PTRS determination method including a step described below.

A second node determines a configuration parameter of the PTRS through configuration signaling transmitted by a first node.

Here, the first node is a base station and the second node is a terminal.

Alternatively, the first node is the base station and the second node is also the base station.

Alternatively, the first node is the terminal and the second node is also the terminal.

Alternatively, the first node is the terminal and the second node is the base station.

The configuration parameter of the PTRS may be the PTRS transmitted by the first node.

The configuration parameter of the PTRS may also be the PTRS transmitted by the second node.

The configuration parameter of the PTRS includes various types of parameters such as a power parameter, a density parameter, a precoding parameter and a sequence parameter.

Sub-Implementation Manner 1

In condition that the parameter is the power parameter, the parameter includes one or more of the following items:

A transmission power offset between ports of the PTRS represents a relative difference between the ports of the PTRS.

A transmission power offset of the PTRS relative to a DMRS port represents a relative difference of transmission power of the PTRS port relative to the DMRS port.

A transmission power offset of the PTRS relative to an SRS port represents a relative difference of transmission power of the PTRS port relative to the SRS port.

A transmission power offset of the PTRS relative to data information represents a relative difference of transmission power of the PTRS port relative to data.

A transmission power offset of the PTRS relative to control information represents a relative difference of transmission power of the PTRS port relative to the control information.

A transmission power offset of the PTRS relative to a CSI-RS represents a relative difference of transmission power of the PTRS port relative to a CSI-RS port.

A transmission power offset of the PTRS relative to a BRS represents a relative difference of transmission power of the PTRS port relative to a BRS port.

In condition that the parameter is a power configuration parameter, a determination method includes one or more of steps described below.

1. A transmission power offset value between the ports of the PTRS is determined through the control information transmitted by the first node. The offset value may be measured by a decibel (dB). An offset may be an offset between ports, a power offset between PTRSs transmitted on different time domain resources, a power offset between PTRSs on different frequency domain resources and/or time domain resources, or a power offset between PTRSs on different code domain resources.

2. An offset reference object is determined through the control information. For example, the offset reference object is the CSI-RS, a DL DMRS, the BRS, an SRS or a UL DMRS. Which reference signal is the reference object needs to be determined through the control information.

3. Reference signal information associated with power of the PTRS is determined through the control information, for example, which reference signal ports are used as the reference object. For example, selection information of an associated SRS port of PTRS port power is determined through the control information.

Selection information of an associated DMRS port of the PTRS port power is determined through the control information.

Selection information of an associated CSI-RS port of the PTRS port power is determined through the control information.

Selection information of an associated BRS port of the PTRS port power is determined through the control information.

An association relationship includes that power of the PTRS is the same as power of an associated reference signal port, or that the power of the PTRS is a sum of power of associated reference signal ports.

4. A power offset value is determined through precoding information. For example, a 0 element in a precoding matrix or vector indicates that the corresponding port is not selected. A non-zero element in the precoding matrix represents that the corresponding port is selected. A difference between module values squared of the non-zero elements indicates a power difference between the ports.

The signaling here may be physical layer signal, MAC layer signal or high layer RRC signaling.

Sub-Implementation Manner 2

In condition that the parameter is a precoding configuration parameter, the second node may determine an associated reference signal of PTRS port precoding through the signaling transmitted by the first node. A determination method includes one or more of steps described below.

Selection information of an associated SRS port of the PTRS port precoding is determined through control information.

Selection information of an associated DMRS port of the PTRS port precoding is determined through the control information.

Selection information of an associated CSI-RS port of the PTRS port precoding is determined through the control information.

Selection information of an associated BRS port of the PTRS port precoding is determined through the control information.

An association relationship includes that the PTRS port precoding is the same as precoding of an associated reference signal port, or that the PTRS port precoding is a weighted combination of associated reference signal ports.

The method for determining the precoding through the control information may further include determining a reference signal type associated with the PTRS port precoding. A candidate type includes at least one of a DMRS, an SRS, a CSI-RS or a BRS.

Sub-Implementation Manner 3

In condition that the parameter is a density configuration parameter, a method for determining the density parameter through control information includes one or more of determining an associated reference signal of a PTRS port density through the control information, or determining a multiple relationship of the PTRS port density relative to the associated reference signal through the control information. An association relationship includes that a PTRS density is the same as a density of an associated reference signal port; or the PTRS density is an integer multiple of the density of the associated reference signal port.

Sub-Implementation Manner 4

In condition that the parameter is a sequence configuration parameter, a method for determining the sequence configuration parameter through control information includes one or more of determining an associated reference signal of a PTRS port sequence through the control information.

An association relationship includes that a PTRS sequence has a same sequence parameter as an associated reference signal port. The sequence parameter includes one or more of a sequence type or a sequence initialization parameter.

Sub-Implementation Manner 5

In condition that the parameter is a quasi-co-location parameter, a method for determining a quasi-co-location relationship through control information includes one or more of steps described below.

Selection information of an SRS port quasi-co-located with a PTRS port is determined through the control information.

Selection information of a DMRS port quasi-co-located with the PTRS port is determined through the control information.

Selection information of an associated CSI-RS port quasi-co-located with the PTRS port is determined through the control information.

Selection information of a BRS port quasi-co-located with the PTRS port is determined through the control information.

Example 3

This embodiment provides a PTRS determination method including a step described below.

A second node determines a configuration parameter of the PTRS through some pre-agreed implicit rules.

Here, a first node is a base station and the second node is a terminal.

Alternatively, the first node is the base station and the second node is also the base station.

Alternatively, the first node is the terminal and the second node is also the terminal.

Alternatively, the first node is the terminal and the second node is the base station.

The configuration parameter of the PTRS may be the PTRS transmitted by the first node.

The configuration parameter of the PTRS may also be the PTRS transmitted by the second node.

The configuration parameter of the PTRS includes various types of parameters such as a power parameter, a density parameter, a precoding parameter and a sequence parameter.

Sub-Implementation Manner 1

In condition that the parameter is the power parameter, the second node determines power of the PTRS through an agreed implicit rule.

For example, the power parameter of the PTRS is determined according to a number of ports of the PTRS.

A typical case is that if the PTRS has a smaller number of ports, each port has higher transmission power.

Therefore, power offset values of different PTRS ports may be agreed. A simple example is shown in table 1.

TABLE 1

| 1 PTRS port | 2 PTRS ports | 4 PTRS ports | 8 PTRS ports |
| --- | --- | --- | --- |
| Offset = 0 dB | Offset = −1 dB | Offset = −3 dB | Offset = −6 dB |

The offset here may be an offset of the power of the PTRS relative to other reference signals, data or control information.

For example, the power parameter of the PTRS is determined according to a number of DMRS ports associated with the PTRS.

The larger the number of DMRS ports associated with the PTRS, the higher the transmission power, as shown in table 2.

TABLE 2

| 1 PTRS port associated with 1 DMRS port | 1 PTRS port associated with more than 1 DMRS port |
| --- | --- |
| Offset = 0 dB | Offset = 3 dB |

For example, the power parameter of the PTRS is determined according to power of a DMRS associated with the PTRS.

The power of the PTRS has a linear relationship with the power of the associated DMRS. The higher the power of the associated DMRS, the higher the power of the PTRS.

For example, the power parameter of the PTRS is determined according to an MCS.

The power of the PTRS is related to the MCS. The PTRS has higher power when a higher-order modulation scheme is used.

For example, the power parameter of the PTRS is determined according to an allocated frequency domain resource and/or an allocated time domain resource.

The power parameter of the PTRS is related to the allocated frequency domain resource and/or the allocated time domain resource. The PTRS has higher transmission power when fewer frequency domain resources and/or time domain resources are allocated.

For example, the power parameter of the PTRS is determined according to an operating frequency.

The power parameter of the PTRS is related to the operating frequency. A higher frequency point results in greater phase noise and accordingly a power offset is higher.

For example, the power parameter of the PTRS is determined according to a transmission mode/technical type.

The power parameter of the PTRS is related to the transmission mode/technical type. Different transmission modes or transmission technologies are affected differently by the phase noise, so the power offset may be different.

For example, the power parameter of the PTRS is determined according to a type of DCI.

The power parameter of the PTRS is related to the type of DCI. Different types of DCI may correspond to different transmission modes or transmission technologies affected differently by the phase noise, so the power offset may be different.

For example, the power parameter of the PTRS is determined according to a time/frequency density of the PTRS.

The power parameter of the PTRS is determined to be related to the time/frequency density of the PTRS. If the time/frequency density is lower, the power offset may be agreed to have a greater value.

For example, the power parameter of the PTRS is determined according to mapping from a code stream to a layer.

The power parameter of the PTRS is related to the mapping from a code stream to a layer. When one codeword stream is mapped onto multiple layers and correspond to the PTRS of one port, the PTRS may have higher power when the one codeword stream is mapped onto more layers. For example, the power parameter of the PTRS is determined according to a multiple access manner.

Different multiple access manners are affected differently by the phase noise. A type multiple access manner includes a CP-OFDM and a SC-FDMA, which may be provided with different PTRS power offset parameters.

For example, the power parameter of the PTRS is determined according to a value of an OCC.

A longer OCC indicates more multiplexed reference signals and accordingly a single port has lower PTRS power.

The OCC here may be an OCC of the PTRS or an OCC of the associated reference signal.

The OCC is short for an orthogonal cover code.

For example, the power parameter of the PTRS is determined according to a PTRS sequence.

Different PTRS sequences or different sequence of the associated reference signal may correspond to different power offsets.

For example, the power parameter of the PTRS is determined according to a quasi-co-location relationship between the PTRS and the other reference signal.

The quasi-co-location relationship between the PTRS and the other reference signal may be used for determining an association relationship between the PTRS and the other reference signal and thus the power parameter of the PTRS may be determined.

The power parameter includes an absolute power value or the power offset value. Absolution power is generally measured by dBm and phase power is generally measured by dB.

Sub-Implementation Manner 2

In condition that the parameter is the density parameter, the second node determines a density of the PTRS through an agreed implicit rule.

For example, the density parameter of the PTRS is determined according to a number of ports of the PTRS.

Different numbers of ports of the PTRS may correspond to different densities of the PTRS. A larger number of ports may correspond to a lower density.

For example, the density parameter of the PTRS is determined according to a number of DMRS ports associated with the PTRS.

A larger number of DMRS ports associated with the PTRS may correspond to a higher density.

For example, the density parameter of the PTRS is determined according to a density of a DMRS associated with the PTRS.

A higher density of the DMRS associated with the PTRS may correspond to a higher density.

For example, the density parameter of the PTRS is determined according to an MCS.

A higher-order modulation scheme corresponds to a high density of the PTRS.

For example, the density parameter of the PTRS is determined according to an allocated frequency domain resource and/or an allocated time domain resource.

The PTRS may have a higher density when fewer frequency domain resources and/or time domain resources are allocated.

For example, the density parameter of the PTRS is determined according to an operating frequency.

The PTRS has a higher density when the work frequency point is higher.

For example, the density parameter of the PTRS is determined according to a transmission mode/technical type.

Different density parameters of the PTRS may be agreed for different transmission modes/technical types respectively.

For example, the density parameter of the PTRS is determined according to a type of DCI.

Different DCI corresponds to different transmission modes/technical types and different density parameters of the PTRS may be agreed for the different DCI respectively.

For example, the density parameter of the PTRS is determined according to a power parameter of the PTRS.

The PTRS may have a lower density when power is higher.

For example, the density parameter of the PTRS is determined according to mapping from a code stream to a layer.

The PTRS has a higher density when more layers are mapped onto.

For example, the density parameter of the PTRS is determined according to a multiple access manner.

Different densities of the PTRS are set for different multiple access manners.

For example, the density parameter of the PTRS is determined according to a value of an OCC.

Different densities of the PTRS are set for different lengths of the OCC.

For example, the density of the PTRS is determined according to a maximum number of PTRS REs.

The maximum number of PTRS REs in frequency domain and/or time domain is agreed and the density of the PTRS is determined according to the agreed number and the allocated time and frequency resources.

The density parameter includes a time domain density and/or a frequency domain density.

Sub-Implementation Manner 3

In condition that the parameter is a number of ports, the second node determines the number of ports of the PTRS through an agreed implicit rule in one or more of manners described below.

For example, the number of ports of the PTRS is determined according to a density of the PTRS.

The PTRS has a smaller number of ports when the density is higher.

For example, the number of ports of the PTRS is determined according to an MCS.

A higher-order modulation scheme corresponds to a larger number of ports of the PTRS.

For example, the number of ports of the PTRS is determined according to an allocated frequency domain resource and/or an allocated time domain resource.

The PTRS has a smaller number of ports when fewer frequency domain resources and/or time domain resources are allocated.

For example, the number of ports of the PTRS is determined according to an operating frequency.

A higher frequency point corresponds to more ports.

For example, the number of ports of the PTRS is determined according to a transmission mode/technical type.

Different numbers of ports of the PTRS are set for different transmission modes/technical types.

For example, the number of ports of the PTRS is determined according to a type of DCI.

Different numbers of ports of the PTRS are set for different types of DCI.

For example, the number of ports of the PTRS is determined according to mapping from a code stream to a layer.

Different numbers of ports of the PTRS are set for different manners for mapping a codeword stream onto the layer.

For example, the number of ports of the PTRS is determined according to a multiple access manner.

Different numbers of ports of the PTRS are set for different multiple access manners.

For example, the number of ports of the PTRS is determined according to a value of an OCC.

Different numbers of ports of the PTRS are set for different values of the OCC.

Sub-Implementation Manner 4

In condition that the parameter is the sequence parameter, the second node determines the sequence parameter of the PTRS through an agreed implicit rule in one or more of manners described below.

For example, the sequence parameter of the PTRS is determined according to an MCS.

Different modulation schemes correspond to different sequence parameters of the PTRS.

For example, the sequence parameter of the PTRS is determined according to an allocated frequency domain resource and/or an allocated time domain resource.

Different frequency domain resources and/or time domain resources correspond to different sequence parameters of the PTRS.

For example, the sequence parameter of the PTRS is determined according to an operating frequency.

Different operating frequencies correspond to different sequence parameters of the PTRS.

For example, the sequence parameter of the PTRS is determined according to a transmission mode/technical type.

Different transmission modes/technical types correspond to different sequence parameters of the PTRS.

For example, the sequence parameter of the PTRS is determined according to a type of DCI.

Different types of DCI correspond to different sequence parameters of the PTRS.

For example, the sequence parameter of the PTRS is determined according to a multiple access manner.

Different multiple access manners correspond to different sequence parameters of the PTRS.

For example, the sequence parameter of the PTRS is determined according to a sequence parameter of a reference signal associated with the PTRS.

The PTRS may be associated with an SRS, a CSI-RS, a DMRS or the like. A sequence of the PTRS is related to a sequence parameter of the DMRS associated with the PTRS. Taking the DMRS as an example, the sequence of the PTRS may be determined according to a scrambling sequence of the DMRS associated with the PTRS.

The sequence parameter mentioned above includes at least one of a sequence initialization parameter or a sequence type.

Sub-Implementation Manner 5

In condition that the parameter is a pattern of the PTRS, the second node determines the pattern of the PTRS through an agreed implicit rule in at least one of manners described below.

For example, the pattern of the PTRS is determined according to a number of ports of the PTRS.

Different numbers of ports of the PTRS corresponds to different patterns of the PTRS.

For example, the pattern of the PTRS is determined according to a pattern of a DMRS port associated with the PTRS.

Pattern configuration of the DMRS port is also used for changing the pattern of the PTRS.

For example, the pattern of the PTRS is determined according to an MCS.

Different MCSs may correspond to different patterns of the PTRS. The MCS will change the pattern of the PTRS.

For example, the pattern of the PTRS is determined according to an allocated frequency domain resource and/or an allocated time domain resource.

Different frequency domain resources and/or time domain resources correspond to different patterns of the PTRS.

For example, the pattern of the PTRS is determined according to an operating frequency.

Different frequency points may correspond to different patterns of the PTRS.

For example, the pattern of the PTRS is determined according to a transmission mode/technical type.

Different transmission modes/technical types may correspond to different patterns of the PTRS.

For example, the pattern of the PTRS is determined according to a type of DCI.

Different types of DCI may correspond to different patterns of the PTRS.

For example, the pattern of the PTRS is determined according to a power parameter of the PTRS.

Different power of the PTRS may correspond to different patterns of the PTRS.

For example, the pattern of the PTRS is determined according to mapping from a code stream to a layer.

Different manners for mapping the code stream to the layer may correspond to different patterns of the PTRS.

For example, the pattern of the PTRS is determined according to a multiple access manner.

Different multiple access manners may correspond to different patterns of the PTRS.

For example, the pattern of the PTRS is determined according to a value of an OCC.

Different values of the OCC may correspond to different patterns of the PTRS.

For example, the pattern of the PTRS is determined according to a maximum number of PTRS REs.

Example 4

In a PTRS information feedback method, a third node transmits control information to a fourth node to feed received power or quality information of the PTRS back to the fourth node.

Here, the third node is a base station and the fourth node is a terminal.

Alternatively, the third node is the base station and the fourth node is also the base station.

Alternatively, the third node is the terminal and the fourth node is also the terminal.

Alternatively, the third node is the terminal and the fourth node is the base station.

The received power or the quality information includes at least one of:

(1) the received power or a quality offset between ports of the PTRS;

(2) the received power or the quality offset of the PTRS relative to a DMRS port;

(3) the received power or the quality offset of the PTRS relative to an SRS port;

(4) the received power or the quality offset of the PTRS relative to date information;

(5) the received power or the quality offset of the PTRS relative to control information;

(6) the received power or the quality offset of the PTRS relative to a CSI-RS; or (7) the received power or the quality offset of the PTRS relative to a BRS.

The received power or the quality information of the PTRS may be fed back through a control channel.

FIG. 6 is a block diagram of a PTRS configuration device according to an embodiment of the present disclosure. The device is applied to a first node and includes a configuration unit 61. The configuration unit 61 is configured to transmit control information to a second node. The control information is used for indicating a configuration parameter of the PTRS to the second node.

The PTRS is transmitted by the first node or the second node.

In an embodiment of the present disclosure, in condition that the configuration parameter is a power configuration parameter, the configuration parameter includes at least one of: a transmission power offset between ports of the PTRS; a transmission power offset of the PTRS relative to a DMRS port; a transmission power offset of the PTRS relative to an SRS port; a transmission power offset of the PTRS relative to data information; a transmission power offset of the PTRS relative to the control information; a transmission power offset of the PTRS relative to a CSI-RS; or a transmission power offset of the PTRS relative to a BRS.

In an embodiment of the present disclosure, in condition that the configuration parameter is the power configuration parameter, the configuration unit 61 is configured to indicate the configuration parameter in at least one of manners described below.

An offset value is indicated through the control information.

An offset reference object is indicated through the control information.

A power offset value is indicated through precoding information.

Reference signal information associated with power of the PTRS is indicated.

The configuration unit 61 is configured to indicate the configuration parameter in at least one of manners described below.

Selection information of an associated SRS port of PTRS port power is indicated.

Selection information of an associated DMRS port of the PTRS port power is indicated.

Selection information of an associated CSI-RS port of the PTRS port power is indicated.

Selection information of an associated BRS port of the PTRS port power is indicated.

The configuration unit 61 is configured to indicate the configuration parameter by indicating a reference signal type associated with the PTRS port power. The reference signal type includes at least one of a DMRS, an SRS, a CSI-RS or a BRS.

Indicating the reference signal information associated with the power of the PTRS includes indicating that the power of the PTRS is the same as power of an associated reference signal port; or indicating that the power of the PTRS is a sum of power of associated reference signal ports.

In an embodiment of the present disclosure, in condition that the configuration parameter is a precoding configuration parameter, the configuration unit 61 is configured to indicate the configuration parameter by indicating an associated reference signal of PTRS port precoding.

The configuration unit 61 is configured to indicate the configuration parameter in at least one of manners described below.

Selection information of an associated SRS port of the PTRS port precoding is indicated.

Selection information of an associated DMRS port of the PTRS port precoding is indicated.

Selection information of an associated CSI-RS port of the PTRS port precoding is indicated.

Selection information of an associated BRS port of the PTRS port precoding is indicated.

The configuration unit 61 is configured to indicate the configuration parameter by notifying a reference signal type associated with the PTRS port precoding. The reference signal type includes at least one of the DMRS, the SRS, the CSI-RS or the BRS.

Indicating the associated reference signal of the PTRS port precoding includes: indicating that the PTRS port precoding is the same as precoding of the associated reference signal port; or indicating that the PTRS port precoding is a weighted combination of the associated reference signal ports.

In an embodiment of the present disclosure, in condition that the configuration parameter is a density configuration parameter, the configuration unit 61 is configured to indicate the configuration parameter in at least one of manners described below.

An associated reference signal of a PTRS port density is indicated.

A multiple relationship of the PTRS port density relative to the associated reference signal is indicated.

The PTRS port density is the same as a density of the associated reference signal port; or the PTRS port density is an integer multiple of the density of the associated reference signal port.

In an embodiment of the present disclosure, in condition that the configuration parameter is a sequence configuration parameter, the configuration unit 61 is configured to indicate the configuration parameter by indicating an associated reference signal of a PTRS port sequence. Indicating the associated reference signal of the PTRS port sequence includes indicating that a PTRS sequence has a same sequence parameter as the associated reference signal port. The sequence parameter includes at least one of a sequence type or a sequence initialization parameter.

In an embodiment of the present disclosure, in condition that the configuration parameter is a quasi-co-location parameter, the configuration unit 61 is configured to indicate the configuration parameter in at least one of manners described below.

Selection information of an SRS port quasi-co-located with a PTRS port is indicated.

Selection information of a DMRS port quasi-co-located with the PTRS port is indicated.

Selection information of a CSI-RS port quasi-co-located with the PTRS port is indicated.

Selection information of a BRS port quasi-co-located with the PTRS port is indicated.

In an embodiment of the present disclosure, in condition that the configuration parameter is a resource configuration parameter, the configuration unit 61 is configured to indicate the configuration parameter by indicating a maximum number of subcarriers or a maximum number of REs of the PTRS port in frequency domain.

In an embodiment of the present disclosure, in condition that the configuration parameter is a parameter for indicating an association relationship between the DMRS port and the PTRS port, the first node indicates PTRS group information associated with the DMRS port via signaling and/or the first node indicates DMRS port group information associated with the PTRS port via the signaling.

FIG. 7 is a block diagram of a PTRS determination device according to an embodiment of the present disclosure. The device is applied to a second node and includes a determination unit 71. The determination unit 71 is configured to determine a configuration parameter of the PTRS through control information transmitted by a first node and/or an agreed implicit rule.

The PTRS is transmitted by the first node or the second node.

In an embodiment of the present disclosure, in condition that the configuration parameter is a parameter for indicating an association relationship between a DMRS port and a PTRS port, the second node determines the association relationship between the DMRS port and the PTRS port through the agreed implicit rule specifically in at least one of manners described below.

A grouping manner of the PTRS is determined according to a number of ports of the PTRS.

The grouping manner of the PTRS is determined according to a density parameter of the PTRS.

The grouping manner of the PTRS is determined according to an MCS.

The grouping manner of the PTRS is determined according to an allocated frequency domain resource and/or an allocated time domain resource.

The grouping manner of the PTRS is determined according to an operating frequency.

The grouping manner of the PTRS is determined according to a transmission mode/technical type.

The grouping manner of the PTRS is determined according to a type of DCI.

The grouping manner of the PTRS is determined according to a power parameter of the PTRS.

The grouping manner of the PTRS is determined according to mapping from a code stream to a layer.

The grouping manner of the PTRS is determined according to a multiple access manner.

The grouping manner of the PTRS is determined according to a value of an OCC.

A density of the PTRS is determined according to a maximum number of PTRS REs.

In an embodiment of the present disclosure, in condition that the configuration parameter is a precoding indication parameter, the second node determines PTRS precoding through the agreed implicit rule specifically in a manner described below.

A codeword is selected from a precoding set for the PTRS precoding according to agreed time domain and/or an agreed time domain resource position.

In an embodiment of the present disclosure, in condition that the configuration parameter is a parameter for indicating a transmission state of the PTRS, the second node determines the transmission state of the PTRS according to the MCS and PTRS transmission state configuration signaling transmitted by the first node. The transmission state includes at least one of: non-transmission, zero power transmission or non-zero power transmission.

In an embodiment of the present disclosure, in condition that the configuration parameter is a power configuration parameter, the configuration parameter includes at least one of: a transmission power offset between ports of the PTRS; a transmission power offset of the PTRS relative to the DMRS port; a transmission power offset of the PTRS relative to an SRS port; a transmission power offset of the PTRS relative to data information; a transmission power offset of the PTRS relative to the control information; a transmission power offset of the PTRS relative to a CSI-RS; or a transmission power offset of the PTRS relative to a BRS.

In an embodiment of the present disclosure, in condition that the configuration parameter is the power configuration parameter, the determination unit 71 determines, through the control information transmitted by the first node, at least one of a power offset value, an offset reference object or a precoding weight value.

In an embodiment of the present disclosure, in condition that the configuration parameter is the power configuration parameter, the determination unit 71 determines, through the control information transmitted by the first node, at least one of: selection information of an associated SRS port of PTRS port power; selection information of an associated DMRS port of the PTRS port power; selection information of an associated CSI-RS port of the PTRS port power; or selection information of an associated BRS port of the PTRS port power.

In an embodiment of the present disclosure, in condition that the configuration parameter is a power parameter, the determination unit 71 determines the power parameter of the PTRS through the agreed implicit rule specifically in at least one of manners described below.

The power parameter of the PTRS is determined according to the number of ports of the PTRS.

The power parameter of the PTRS is determined according to a number of DMRS ports associated with the PTRS.

The power parameter of the PTRS is determined according to power of a DMRS associated with the PTRS.

The power parameter of the PTRS is determined according to the MCS.

The power parameter of the PTRS is determined according to the allocated frequency domain resource and/or the allocated time domain resource.

The power parameter of the PTRS is determined according to the operating frequency.

The power parameter of the PTRS is determined according to the transmission mode/technical type.

The power parameter of the PTRS is determined according to the type of DCI.

The power parameter of the PTRS is determined according to a time/frequency density of the PTRS.

The power parameter of the PTRS is determined according to the mapping from a code stream to a layer.

The power parameter of the PTRS is determined according to the multiple access manner.

The power parameter of the PTRS is determined according to the value of the OCC.

The power parameter of the PTRS is determined according to a PTRS sequence.

The power parameter of the PTRS is determined according to a quasi-co-location relationship between the PTRS and another reference signal.

The power parameter includes an absolute power value or the power offset value.

In an embodiment of the present disclosure, in condition that the configuration parameter is a density parameter, the determination unit 71 determines the density of the PTRS through the agreed implicit rule specifically in at least one of manners described below.

The density parameter of the PTRS is determined according to the number of ports of the PTRS.

The density parameter of the PTRS is determined according to the number of DMRS ports associated with the PTRS.

The density parameter of the PTRS is determined according to a density of the DMRS associated with the PTRS.

The density parameter of the PTRS is determined according to the MCS.

The density parameter of the PTRS is determined according to the allocated frequency domain resource and/or the allocated time domain resource.

The density parameter of the PTRS is determined according to the operating frequency.

The density parameter of the PTRS is determined according to the transmission mode/technical type.

The density parameter of the PTRS is determined according to the type of DCI.

The density parameter of the PTRS is determined according to the power parameter of the PTRS.

The density parameter of the PTRS is determined according to the mapping from a code stream to a layer.

The density parameter of the PTRS is determined according to the multiple access manner.

The density parameter of the PTRS is determined according to the value of the OCC.

The density of the PTRS is determined according to the maximum number of PTRS REs.

The density of the PTRS is determined according to a quasi-co-location relationship on a frequency offset or a Doppler offset between the PTRS and the other reference signal.

The density parameter includes a time domain density and/or a frequency domain density.

In an embodiment of the present disclosure, in condition that the configuration parameter is a number of ports, the determination unit 71 determines the number of ports of the PTRS through the agreed implicit rule specifically in at least one of manners described below.

The number of ports of the PTRS is determined according to the density of the PTRS.

The number of ports of the PTRS is determined according to the MCS.

The number of ports of the PTRS is determined according to the allocated frequency domain resource and/or the allocated time domain resource.

The number of ports of the PTRS is determined according to the operating frequency.

The number of ports of the PTRS is determined according to the transmission mode/technical type.

The number of ports of the PTRS is determined according to the type of DCI.

The number of ports of the PTRS is determined according to the time/frequency density of the PTRS.

The number of ports of the PTRS is determined according to the mapping from a code stream to a layer.

The number of ports of the PTRS is determined according to the multiple access manner.

The number of ports of the PTRS is determined according to the value of the OCC.

The number of ports of the PTRS is determined according to the quasi-co-location relationship between the PTRS and the other reference signal.

In an embodiment of the present disclosure, in condition that the configuration parameter is a sequence parameter, the determination unit 71 determines the sequence parameter of the PTRS through the agreed implicit rule specifically in at least one of manners described below.

The sequence parameter of the PTRS is determined according to the MCS.

The sequence parameter of the PTRS is determined according to the allocated frequency domain resource and/or the allocated time domain resource.

The sequence parameter of the PTRS is determined according to the operating frequency.

The sequence parameter of the PTRS is determined according to the transmission mode/technical type.

The sequence parameter of the PTRS is determined according to the type of DCI.

The sequence parameter of the PTRS is determined according to the multiple access manner.

The sequence parameter of the PTRS is determined according to a sequence parameter of a reference signal associated with the PTRS.

The sequence parameter includes at least one of a sequence initialization parameter or a sequence type.

In an embodiment of the present disclosure, in condition that the configuration parameter is a pattern of the PTRS, the determination unit 71 determines the pattern of the PTRS through the agreed implicit rule specifically in at least one of manners described below.

The pattern of the PTRS is determined according to the number of ports of the PTRS.

The pattern of the PTRS is determined according to a pattern of a DMRS port associated with the PTRS.

The pattern of the PTRS is determined according to the MCS.

The pattern of the PTRS is determined according to the allocated frequency domain resource and/or the allocated time domain resource.

The pattern of the PTRS is determined according to the operating frequency.

The pattern of the PTRS is determined according to the transmission mode/technical type.

The pattern of the PTRS is determined according to the type of DCI.

The pattern of the PTRS is determined according to the power parameter of the PTRS.

The pattern of the PTRS is determined according to the mapping from a code stream to a layer.

The pattern of the PTRS is determined according to the multiple access manner.

The pattern of the PTRS is determined according to the value of the OCC.

The pattern of the PTRS is determined according to the maximum number of PTRS REs.

In an embodiment of the present disclosure, in condition that the configuration parameter is a resource configuration parameter, the determination unit 71 determines, through the control information transmitted by the first node, a maximum number of subcarriers or a maximum number of REs of the PTRS port in frequency domain.

Figure 8:
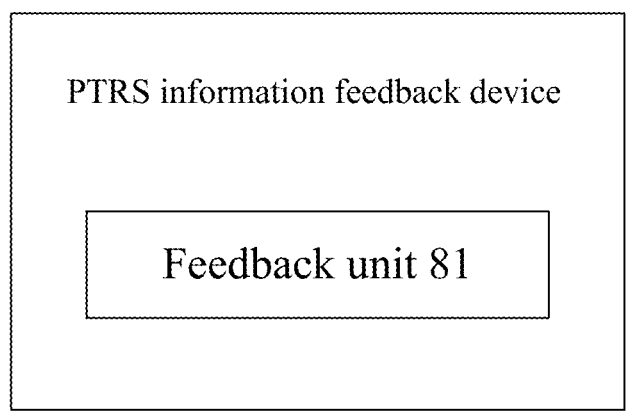
FIG. 8 is a block diagram of a PTRS information feedback device according to an embodiment of the present disclosure.

FIG. 8 is a block diagram of a PTRS information feedback device according to an embodiment of the present disclosure. The device is applied to a third node and includes a feedback unit 81. The feedback unit 81 is configured to transmit control information to a fourth node. The control information is used for feeding received power or quality information of the PTRS back to the fourth node.

In an embodiment of the present disclosure, the received power or the quality information includes at least one of: the received power or a quality offset between ports of the PTRS; the received power or the quality offset of the PTRS relative to a DMRS port; the received power or the quality offset of the PTRS relative to an SRS port; the received power or the quality offset of the PTRS relative to date information; the received power or the quality offset of the PTRS relative to the control information; the received power or the quality offset of the PTRS relative to a CSI-RS; or the received power or the quality offset of the PTRS relative to a BRS.

It should be understood by those skilled in the art that the description of the devices in the embodiments of the present disclosure can be understood with reference to the description of the corresponding methods.

An embodiment of the present disclosure further provides a computer-readable storage medium. The computer-readable storage medium is configured to store computer-executable instructions for implementing any one of the methods described above in condition that executed by a processor.

It should be understood by those skilled in the art that function modules/units in all or part of the steps of the method, the system and the device disclosed above may be implemented as software, firmware, hardware and appropriate combinations thereof. In the hardware implementation, the division of the function modules/units mentioned in the above description may not correspond to the division of physical components. For example, one physical component may have several functions, or one function or step may be implemented jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage devices, or any other media used for storing desired information and accessed by a computer. In addition, as is known to those skilled in the art, the communication medium generally includes computer-readable instructions, data structures, program modules or other data in modulated data signals such as carriers or other transmission mechanisms, and may include any information delivery medium. The above are only exemplary embodiments of the present disclosure and are not intended to limit the scope of the present disclosure.

What is claimed is:

1. A phase tracking reference signal (PTRS) configuration method, comprising:
    transmitting, by a first node, control information to a second node, wherein the control information is used for indicating a configuration parameter of a PTRS to the second node; and
    wherein the PTRS is transmitted by the first node or the second node;
wherein in condition that the configuration parameter is a quasi-co-location parameter, a way for indicating the configuration parameter comprises at least one of:
    indicating selection information of an SRS port quasi-co-located with a PTRS port;
    indicating selection information of a CSI-RS port quasi-co-located with the PTRS port; or
    indicating selection information of a BRS port quasi-co-located with the PTRS port.

2. The method of claim 1, wherein in condition that the configuration parameter is a precoding configuration parameter, a way for indicating the configuration parameter comprises: indicating an associated reference signal of PTRS port precoding.

3. The method of claim 2, wherein the way for indicating the configuration parameter further comprises at least one of:
    indicating selection information of an associated SRS port of the PTRS port precoding;
    indicating selection information of an associated DMRS port of the PTRS port precoding;
    indicating selection information of an associated CSI-RS port of the PTRS port precoding; or
    indicating selection information of an associated BRS port of the PTRS port precoding.

4. A phase tracking reference signal (PTRS) configuration device, applied to a first node, comprising:
    a processor;
    a memory, which is configured to store programs executable by the processor; wherein the processor is configured to execute the programs, when executed, perform the method of claim 1.

5. A phase tracking reference signal (PTRS) determination method, comprising:
    determining, by a second node, a configuration parameter of a PTRS through one of:
    control information transmitted by a first node;
    an agreed implicit rule; or
    a combination of the control information transmitted by the first node and the agreed implicit rule;
    wherein the PTRS is transmitted by the first node or the second node;
    wherein in condition that the configuration parameter is a power configuration parameter, the configuration parameter comprises at least one of:
        a transmission power offset between ports of the PTRS;
        a transmission power offset of the PTRS relative to a DMRS port;
        a transmission power offset of the PTRS relative to a sounding reference signal (SRS) port;
        a transmission power offset of the PTRS relative to the control information;
        a transmission power offset of the PTRS relative to a channel state information-reference signal (CSI-RS); or
        a transmission power offset of the PTRS relative to a beam reference signal (BRS).

6. The method of claim 5, wherein in condition that the configuration parameter is a parameter for indicating a transmission state of the PTRS, the second node determines the transmission state of the PTRS according to a modulation and coding scheme (MCS) and PTRS transmission state configuration signaling transmitted by the first node, wherein the transmission state comprises at least one of: non-transmission, zero power transmission or non-zero power transmission.

7. The method of claim 5, wherein the second node determines, through the control information transmitted by the first node, at least one of:
    selection information of an associated SRS port of PTRS port power;
    selection information of an associated DMRS port of the PTRS port power;
    selection information of an associated CSI-RS port of the PTRS port power; or
    selection information of an associated BRS port of the PTRS port power.

8. The method of claim 5, wherein in condition that the configuration parameter is a power parameter, determining, by the second node, the power parameter of the PTRS through the agreed implicit rule comprises at least one of:
    determining the power parameter of the PTRS according to a number of ports of the PTRS;
    determining the power parameter of the PTRS according to a number of DMRS ports associated with the PTRS;
    determining the power parameter of the PTRS according to power of a DMRS associated with the PTRS;
    determining the power parameter of the PTRS according to an MCS;
    determining the power parameter of the PTRS according to an allocated frequency domain resource, an allocated time domain resource, or a combination of the allocated frequency domain resource and the allocated time domain resource;
    determining the power parameter of the PTRS according to an operating frequency;
    determining the power parameter of the PTRS according to a transmission mode/technical type;
    determining the power parameter of the PTRS according to a type of DCI;
    determining the power parameter of the PTRS according to a time/frequency density of the PTRS;
    determining the power parameter of the PTRS according to mapping from a code stream to a layer;
    determining the power parameter of the PTRS according to a multiple access manner;
    determining the power parameter of the PTRS according to a value of an OCC;
    determining the power parameter of the PTRS according to a PTRS sequence; or
    determining the power parameter of the PTRS according to a quasi-co-location relationship between the PTRS and another reference signal;

wherein the power parameter comprises an absolute power value or a power offset value.

9. The method of claim 5, wherein in condition that the configuration parameter is a density parameter, determining, by the second node, a density of the PTRS through the agreed implicit rule comprises at least one of:
determining the density parameter of the PTRS according to a number of ports of the PTRS;
determining the density parameter of the PTRS according to a number of DMRS ports associated with the PTRS;
determining the density parameter of the PTRS according to a density of a DMRS associated with the PTRS;
determining the density parameter of the PTRS according to an MCS;
determining the density parameter of the PTRS according to an allocated frequency domain resource, an allocated time domain resource, or a combination of the allocated frequency domain resource and the allocated time domain resource;
determining the density parameter of the PTRS according to an operating frequency point;
determining the density parameter of the PTRS according to a transmission mode/technical type;
determining the density parameter of the PTRS according to a type of DCI;
determining the density parameter of the PTRS according to a power parameter of the PTRS;
determining the density parameter of the PTRS according to mapping from a code stream to a layer;
determining the density parameter of the PTRS according to a multiple access manner;
determining the density parameter of the PTRS according to a value of an OCC;
determining the density of the PTRS according to a maximum number of PTRS REs; or
determining the density of the PTRS according to a quasi-co-location relationship on a frequency offset or a Doppler offset between the PTRS and another reference signal;
wherein the density parameter comprises a time domain density, a frequency domain density or a combination of the time domain density and the frequency domain density.

10. The method of claim 5, wherein in condition that the configuration parameter is a pattern of the PTRS, determining, by the second node, the pattern of the PTRS through the agreed implicit rule specifically comprises at least one of:
determining the pattern of the PTRS according to a number of ports of the PTRS;
determining the pattern of the PTRS according to a pattern of a DMRS port associated with the PTRS;
determining the pattern of the PTRS according to an MCS;
determining the pattern of the PTRS according to an allocated frequency domain resource, an allocated time domain resource, or a combination of the allocated frequency domain resource and the allocated time domain resource;
determining the pattern of the PTRS according to an operating frequency;
determining the pattern of the PTRS according to a transmission mode/technical type;
determining the pattern of the PTRS according to a type of DCI;
determining the pattern of the PTRS according to a power parameter of the PTRS;

determining the pattern of the PTRS according to mapping from a code stream to a layer;
determining the pattern of the PTRS according to a multiple access manner;
determining the pattern of the PTRS according to a value of an OCC; or
determining the pattern of the PTRS according to a maximum number of PTRS REs.

11. A phase tracking reference signal (PTRS) determination device, applied to a second node, comprising:
a determination unit, configured to determine a configuration parameter of a PTRS through control information transmitted by a first node, an agreed implicit rule or a combination of the control information transmitted by the first node and the agreed implicit rule;
wherein the PTRS is transmitted by the first node or the second node;
wherein in condition that the configuration parameter is a power configuration parameter, the configuration parameter comprises at least one of:
a transmission power offset between ports of the PTRS;
a transmission power offset of the PTRS relative to a DMRS port;
a transmission power offset of the PTRS relative to a sounding reference signal (SRS) port;
a transmission power offset of the PTRS relative to the control information;
a transmission power offset of the PTRS relative to a channel state information-reference signal (CSI-RS); or
a transmission power offset of the PTRS relative to a beam reference signal (BRS).

12. The device of claim 11, wherein in condition that the configuration parameter is a parameter for indicating a transmission state of the PTRS, the second node determines the transmission state of the PTRS according to an MCS and PTRS transmission state configuration signaling transmitted by the first node, wherein the transmission state comprises at least one of: non-transmission, zero power transmission or non-zero power transmission.

13. The device of claim 11, wherein the determination unit determines, through the control information transmitted by the first node, at least one of:
selection information of an associated SRS port of PTRS port power;
selection information of an associated DMRS port of the PTRS port power;
selection information of an associated CSI-RS port of the PTRS port power; or
selection information of an associated BRS port of the PTRS port power.

14. The device of claim 11, wherein in condition that the configuration parameter is a power parameter, determining, by the determination unit, the power parameter of the PTRS through the agreed implicit rule specifically comprises at least one of:
determining the power parameter of the PTRS according to a number of ports of the PTRS;
determining the power parameter of the PTRS according to a number of DMRS ports associated with the PTRS;
determining the power parameter of the PTRS according to power of a DMRS associated with the PTRS;
determining the power parameter of the PTRS according to an MCS;
determining the power parameter of the PTRS according to an allocated frequency domain resource, an allocated time domain resource, or a combination of the allocated frequency domain resource and the allocated time domain resource;

determining the power parameter of the PTRS according to an operating frequency point;

determining the power parameter of the PTRS according to a transmission mode/technical type;

determining the power parameter of the PTRS according to a type of DCI;

determining the power parameter of the PTRS according to a time/frequency density of the PTRS;

determining the power parameter of the PTRS according to mapping from a code stream to a layer;

determining the power parameter of the PTRS according to a multiple access manner;

determining the power parameter of the PTRS according to a value of an OCC;

determining the power parameter of the PTRS according to a PTRS sequence; or determining the power parameter of the PTRS according to a quasi-co-location relationship between the PTRS and another reference signal;

wherein the power parameter comprises an absolute power value or a power offset value.

15. The device of claim 11, wherein in condition that the configuration parameter is a density parameter, determining, by the determination unit, a density of the PTRS through the agreed implicit rule specifically comprises at least one of:

determining the density parameter of the PTRS according to a number of ports of the PTRS;

determining the density parameter of the PTRS according to a number of DMRS ports associated with the PTRS;

determining the density parameter of the PTRS according to a density of a DMRS associated with the PTRS;

determining the density parameter of the PTRS according to an MCS;

determining the density parameter of the PTRS according to an allocated frequency domain resource, an allocated time domain resource, or a combination of the allocated frequency domain resource and the allocated time domain resource;

determining the density parameter of the PTRS according to an operating frequency point;

determining the density parameter of the PTRS according to a transmission mode/technical type;

determining the density parameter of the PTRS according to a type of DCI;

determining the density parameter of the PTRS according to a power parameter of the PTRS;

determining the density parameter of the PTRS according to mapping from a code stream to a layer;

determining the density parameter of the PTRS according to a multiple access manner;

determining the density parameter of the PTRS according to a value of an OCC;

determining the density of the PTRS according to a maximum number of PTRS REs; or determining the density of the PTRS according to a quasi-co-location relationship on a frequency offset or a Doppler offset between the PTRS and another reference signal;

wherein the density parameter comprises a time domain density, a frequency domain density or a combination of the time domain density and the frequency domain density.

16. The device of claim 11, wherein in condition that the configuration parameter is a pattern of the PTRS, determining, by the determination unit, the pattern of the PTRS through the agreed implicit rule specifically comprises at least one of:

determining the pattern of the PTRS according to a number of ports of the PTRS;

determining the pattern of the PTRS according to a pattern of a DMRS port associated with the PTRS;

determining the pattern of the PTRS according to an MCS;

determining the pattern of the PTRS according to an allocated frequency domain resource, an allocated time domain resource, or a combination of the allocated frequency domain resource and the allocated time domain resource;

determining the pattern of the PTRS according to an operating frequency;

determining the pattern of the PTRS according to a transmission mode/technical type;

determining the pattern of the PTRS according to a type of DCI;

determining the pattern of the PTRS according to a power parameter of the PTRS;

determining the pattern of the PTRS according to mapping from a code stream to a layer;

determining the pattern of the PTRS according to a multiple access manner;

determining the pattern of the PTRS according to a value of an OCC; or determining the pattern of the PTRS according to a maximum number of PTRS REs.

* * * * *